(12) United States Patent
Ruiz (10) Patent No.: US 8,733,518 B1
(45) Date of Patent: May 27, 2014

(54) DRIVE PIN ASSEMBLY

(71) Applicant: CWD, LLC, Carson, CA (US)

(72) Inventor: Stephen John Ruiz, Redondo Beach, CA (US)

(73) Assignee: CWD, LLC, Carson, CA (US)

( * ) Notice: Subject to any disclaimer, the term of this patent is extended or adjusted under 35 U.S.C. 154(b) by 27 days.

(21) Appl. No.: 13/689,817

(22) Filed: Nov. 30, 2012

(51) Int. Cl.
*F16D 65/02* (2006.01)
*F16D 65/12* (2006.01)

(52) U.S. Cl.
CPC ...... *F16D 65/123* (2013.01); *F16D 2065/1384* (2013.01); *F16D 2065/1392* (2013.01)
USPC .................................. 188/218 XL; 188/18 A (58) Field of Classification Search
USPC ................. 188/17, 18 A, 26, 218 R
See application file for complete search history.

(56) References Cited

U.S. PATENT DOCUMENTS

| | | | | |
|---|---|---|---|---|
| 4,280,598 | A | * | 7/1981 | Pollinger ................. 188/218 XL |
| 5,444,587 | A | | 8/1995 | Johnson et al. |
| 6,139,215 | A | * | 10/2000 | Kuhne et al. ................... 403/337 |
| 6,357,561 | B2 | | 3/2002 | Ruiz |
| 6,988,598 | B2 | | 1/2006 | Williams |
| 7,163,091 | B2 | | 1/2007 | Shamine et al. |
| 2008/0149435 | A1 | | 6/2008 | Burgoon et al. |

FOREIGN PATENT DOCUMENTS

DE 102011010866 B4 * 10/2012

OTHER PUBLICATIONS

Brochure from Dayton Progress Corporation labeled "Form 900 Feb. 2005".
Wedgelock drawing from Simon Industries, Inc dated Oct. 16, 2007.
Webpage at http://simonindustries.com/wedgelock.php printed out on Nov. 26, 2012.
Webpage at http://www.nord-lock.com/products/wedge-locking/ printed out on Nov. 26, 2012.
Moses Jensen, "Wedgelock Introduction" presentation deck, Wakefield Solutions, dated Mar. 2, 2011.

* cited by examiner

*Primary Examiner* — Anna Momper
(74) *Attorney, Agent, or Firm* — Joseph G. Swan, P.C.

(57) ABSTRACT

Provided are, among other things, systems, apparatuses, components and methods related to drive pin assemblies. One such assembly includes: a first pin component and a second pin component, each having an engagement end that opens to an interior space and has an angled surface that extends for at least a portion of the width and a portion of the length of such first pin component; and a tightening mechanism at least partially disposed within the interior spaces of the first pin component and the second pin component, for drawing the first pin component and the second pin component closer together, where the angled surface of the first pin component matches the angled surface of the second pin component such that the first pin component and the second pin component slide both vertically and laterally along each other when drawn together.

14 Claims, 7 Drawing Sheets

FIG. 11

DRIVE PIN ASSEMBLY

FIELD OF THE INVENTION

The present invention pertains to drive pin assemblies, such as might be used for securing a disc brake rotor to a hub.

BACKGROUND

For the purpose of attaching a disc brake rotor to a wheel hub, it often is desirable to provide a series of equally spaced openings through a mounting ring on the rotor, with such openings being elongated in the radial direction. The rotor can then be attached to the hub using "drive pins" that extend through such openings. An advantage of attaching a rotor in this way is to accommodate radial expansion and contraction of the rotor as it heats and cools, respectively. A variety of different drive pin configurations currently exist. However, each has its own drawbacks, e.g., in terms of ability to securely attach the drive pin to the wheel hub, difficulty of installation, complexity, cost, size, etc.

SUMMARY OF THE INVENTION

The present invention addresses these problems by providing drive pin assemblies, components thereof and methods for using them that can be both effective and easy to implement.

One particular embodiment of the invention is directed to a drive pin assembly that includes: a first pin component and a second pin component, each having an engagement end that opens to an interior space and has an angled surface that extends for at least a portion of the width and a portion of the length of such first pin component; and a tightening mechanism at least partially disposed within the interior spaces of the first pin component and the second pin component, for drawing the first pin component and the second pin component closer together, where the angled surface of the first pin component matches the angled surface of the second pin component such that the first pin component and the second pin component slide both vertically and laterally along each other when drawn together.

The foregoing summary is intended merely to provide a brief description of certain aspects of the invention. A more complete understanding of the invention can be obtained by referring to the claims and the following detailed description of the preferred embodiments in connection with the accompanying figures.

BRIEF DESCRIPTION OF THE DRAWINGS

In the following disclosure, the invention is described with reference to the attached drawings. However, it should be understood that the drawings merely depict certain representative and/or exemplary embodiments and features of the present invention and are not intended to limit the scope of the invention in any manner. The following is a brief description of each of the attached drawings.

DESCRIPTION OF THE PREFERRED EMBODIMENT(S)

The present invention concerns drive pin assemblies, e.g., of the type that may be used to attach a disc brake rotor to a hub (e.g., for use in an automobile or any other motorized vehicle), as well as to components of such assemblies and methods for using such assemblies and/or components. However, it should be noted that the drive pin assemblies according to the present invention also may be used in any of a variety of other situations.

Figure 1:
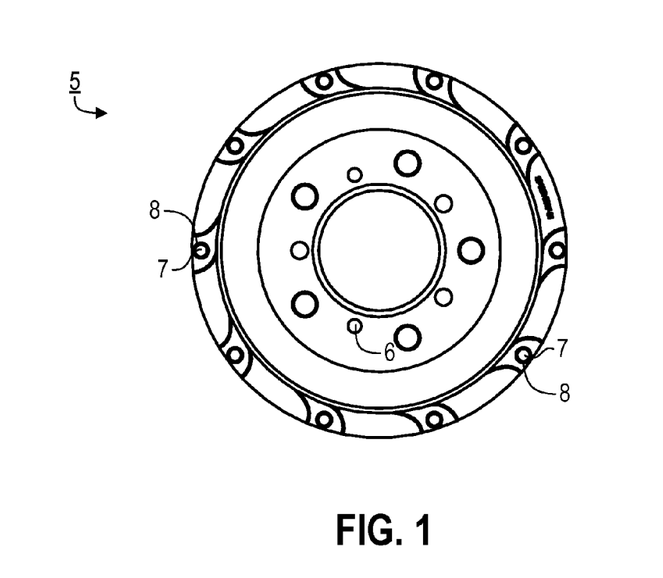
FIG. 1 is a top plan view of a wheel hub or hat.

FIG. 1 illustrates a hub (or hat) 5 that is attached to an axle or a wheel drive assembly of a motorized vehicle (e.g., through openings 6) when in use. One of the purposes of hub 5 is to function as a mounting element for attaching a disc brake rotor. Included in hub 5 is a ring of circular openings (or through-holes) 7, each defined by a sidewall 8, for this purpose.

Figure 2:
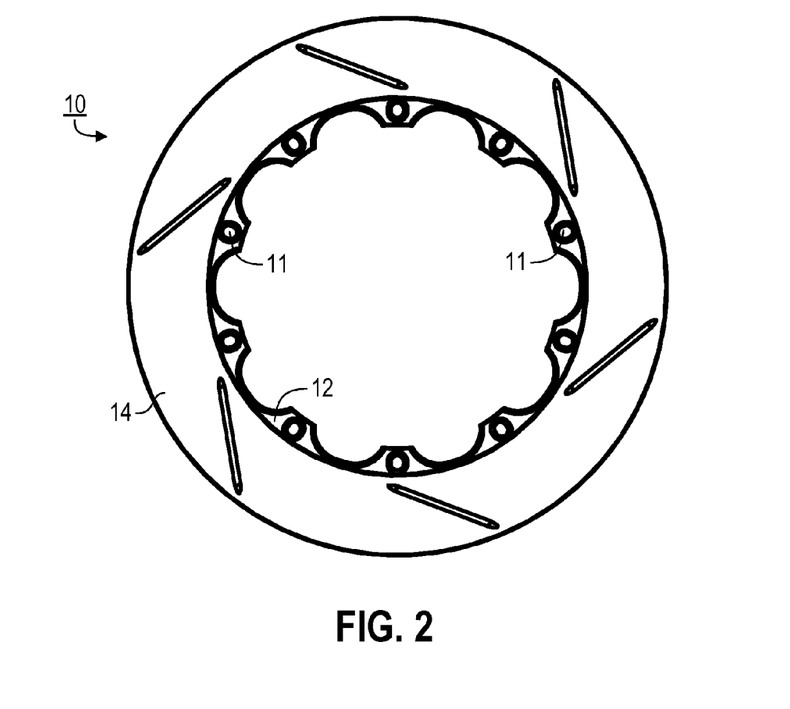
FIG. 2 is a top plan view of a disc brake rotor.

FIG. 2 illustrates a disc brake rotor 10 to be attached to hub 5. A ring of openings (or through-holes) 11 are provided within a mounting section 12 (or ring) of rotor 10. Each of the openings 11 preferably is elongated in the radial direction and has straight sides and rounded ends. Surface 14 is the operative portion of rotor 10, i.e., the portion that comes into contact with the brake pads (not shown) when in use.

In the preferred embodiments of the present invention, a drive pin assembly (such as any of the assemblies described below) extends through each of circular openings 7 in hub 5 and through a corresponding opening 11 in the mounting section 12. In the present embodiment, there are ten openings 7 and ten corresponding openings 11, each being evenly spaced around a circle of the same diameter, so that the two sets of openings align with each other. However, any other number of openings (and corresponding drive pin assemblies) can be used.

Figure 3:
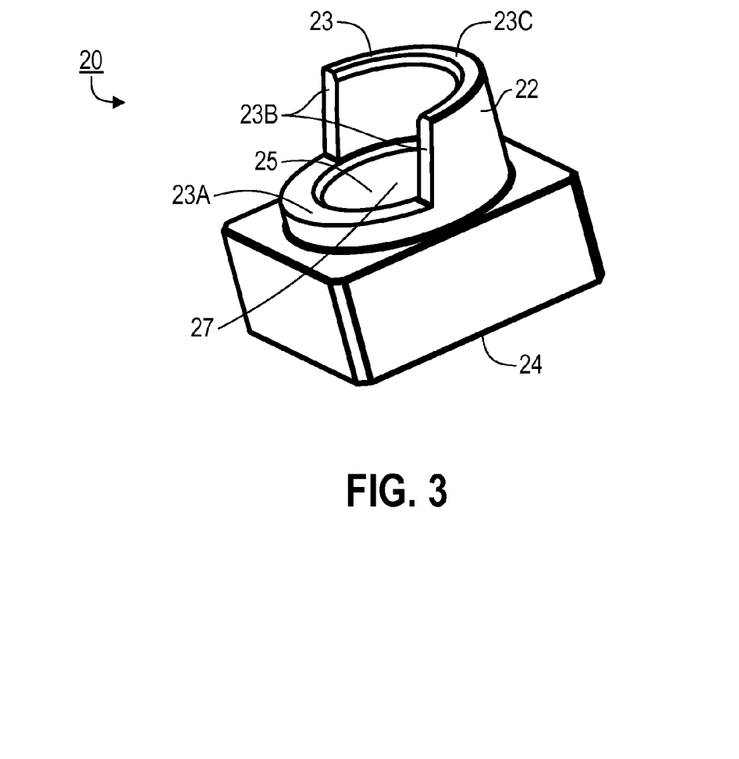
FIG. 3 is a perspective view of a first pin component, primarily showing its engagement end.
Figure 4:
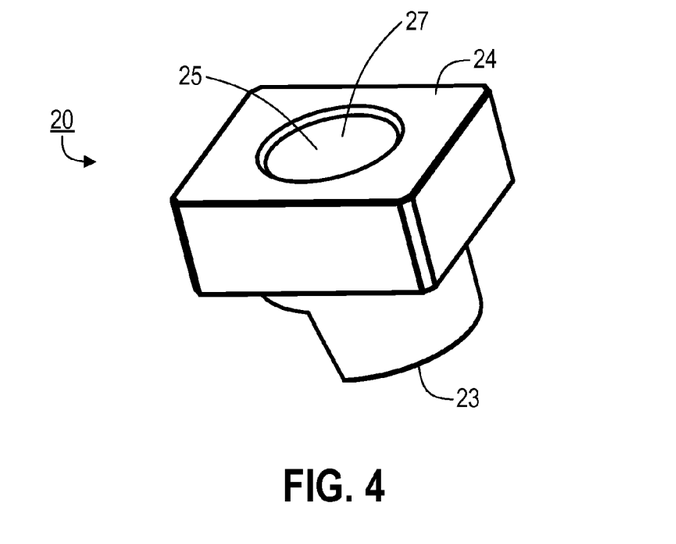
FIG. 4 is a perspective view of the first pin component, primarily showing its outer end.

FIGS. 3 and 4 illustrated a first component 20 of a drive pin assembly according to a representative embodiment of the present invention. In the present embodiment, pin component 20 is made of stainless steel and includes a main portion 22 having the shape of a modified cylinder, an engagement end 23 and an outer end 24. Engagement end 23 is open, defining an interior space 25 within pin component 20. As shown, the surface of engagement end 23 is ridge-like and angled, with different points along this surface extending different lengths. In the present embodiment, outer end 24: (1) is enlarged compared to main portion 22, (2) has a square rather than circular cross-section, and (3) also is open. However, it should be noted that variations are possible. For instance, in alternate embodiments outer end 24 is hexagonal in shape or has any other shape. When component 20 is internally threaded, as in the present embodiment, it is preferable that outer end 24 has a shape that permits it to be held in place rotationally when the mating component is being threaded into it (e.g., having an outside perimeter that can be held with a wrench or that fits into a corresponding shape within hub 5 or having an inner impression that can accommodate an Allen wrench or similar wrench).

In addition, the interior space 25 of component 20 preferably is substantially cylindrically shaped and extends all the way through the length of component 20, functioning as a passageway from engagement end 23 to outer end 24. However, in alternate embodiments, outer end 24 has a continuous (or closed) surface, i.e., so that only engagement end 23 is open. In the preferred embodiments (discussed in greater detail below), the surface 27 defining interior space 25 includes threads. In other embodiments (also discussed below), surface 27 is smooth or otherwise non-threaded.

Figure 5:
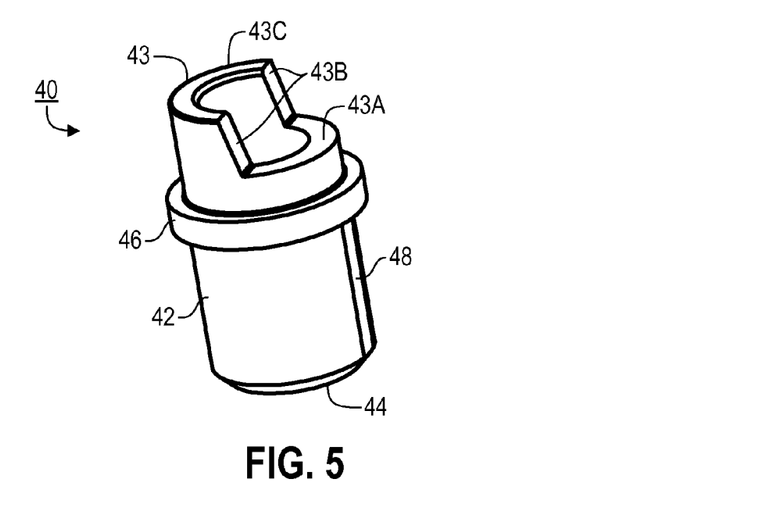
FIG. 5 is a perspective view of a second pin component, primarily showing its engagement end.
Figure 6:
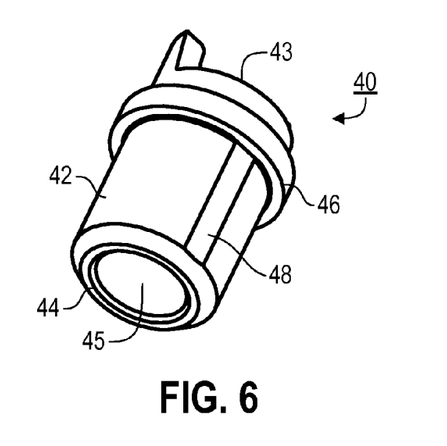
FIG. 6 is a perspective view of the second pin component, primarily showing its outer end.
Figure 7:
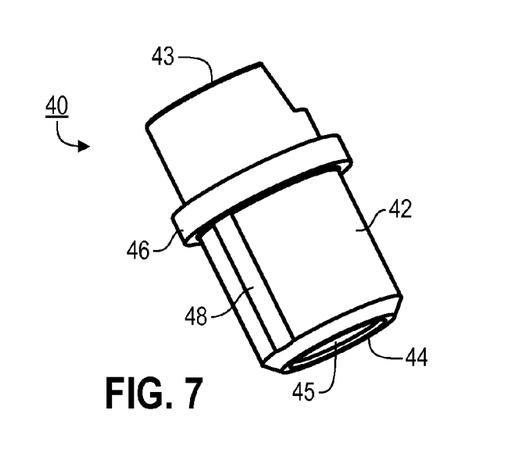
FIG. 7 is a perspective view of the second pin component, primarily showing its back side.

FIGS. 5-7 illustrate a second pin component 40, which has a main portion 42, an engagement end 43 and an outer end 44. In the preferred embodiment, main portion 42 has the shape of a modified cylinder, and both outer end 44 and engagement end 43 are open, defining an interior space 45 within pin component 40 that is substantially cylindrically shaped and functions as a passageway from outer end 44 to engagement end 43. In the current embodiment, pin component 40: (1) is provided with a collar 46 that provides greater width as compared to the rest of main portion 42, (2) includes flat strips 48 on its front and back surfaces, extending along its length, that match the straight side edges of the opening 11 through which it is to extend (e.g., in order to increase the contact surface area between pin component 40 and its corresponding opening 11 and/or in order to facilitate proper orientation of pin component 40 when it is installed), and (3) is made of stainless steel. However, in alternate embodiments, strips 48 are omitted and, e.g., the cross-section of main portion 42 is entirely circular. Preferably, collar 46 is disposed on the outer surface of the main portion 42 at a distance from its outer end 44 that is just slightly greater than a thickness of the rotor mounting section 12 in the vicinity of the opening 11 into which component 40 is to be inserted.

Similar to pin component 20, the surface of engagement end 43 is ridge-like and angled, with different points along such surface extending different lengths. More preferably, the surfaces of engagement ends 23 and 43 match, or are complementary with, each other, so that pin component 20 and pin component 40 slide both vertically and laterally along each other when drawn together.

Figure 8:
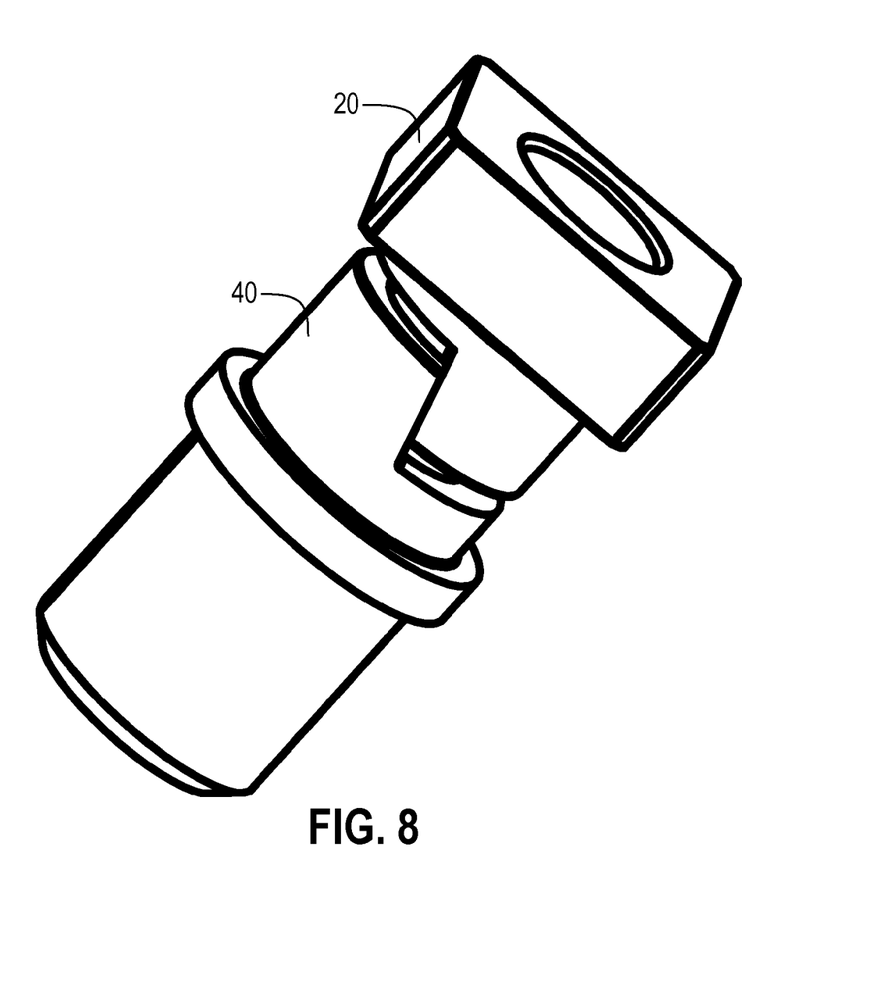
FIG. 8 is a perspective view showing how the first pin component engages with the second pin component.

FIG. 8 illustrates how pin components 20 and 40 fit together when in use. The way in which pin components 20 and 40 interact with each other, with particular emphasis on the surfaces of engagement ends 23 and 43, is now discussed in greater detail with reference to FIG. 9. As shown in the drawings, each of the surfaces of engagement ends 23 and 43 has a substantially flat and horizontal portion (23A and 43A, respectively), followed by an angled portion (23B and 43B, respectively), followed by another substantially flat and horizontal portion (23C and 43C, respectively). Because the cross-sections of the main portions 22 and 42 of pin components 20 and 40, respectively, are circular (or at least substantially circular) in the present embodiment, the outer portions (23A&C and 43A&C, respectively) of their engagement-end surfaces have a semicircular shape.

Figure 9:
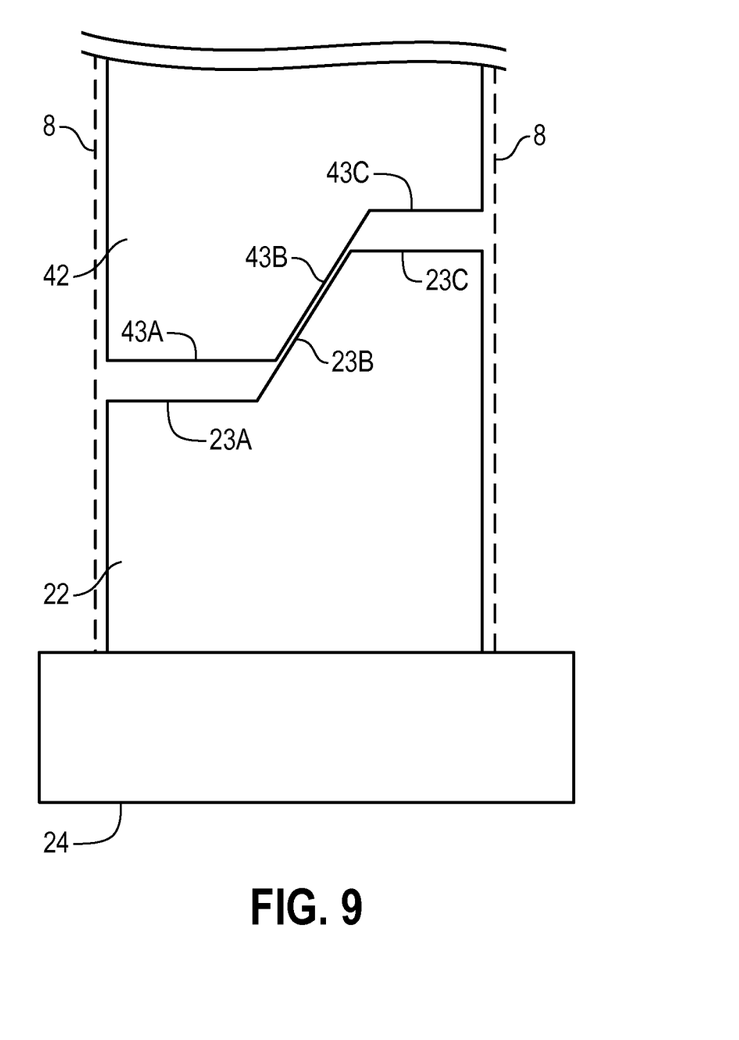
FIG. 9 is a conceptual sectional view showing the first pin component initially engaging with the second pin component.

As shown in FIG. 9, in the present embodiment the angled surfaces 23B and 43B are straight and match each other exactly in angle and length. However, angled surfaces 23B and 43B are laterally offset from each other. More specifically, surface 43A is longer (e.g., in cross-section) than surface 23A, and surface 43C is shorter (e.g., in cross-section) than surface 23C, preferably by the same amount, so that the diameters of the main portions 22 and 42 are the same. As a result of this lateral offset, when the main portions 22 and 42 are aligned with each other laterally (as shown in FIG. 9), just a portion of their angled surfaces 23B and 43B contact each other, and there is a vertical separation between their outer portions (23A&C and 43A&C, respectively). In this position, and assuming engagement ends 23 and 43 are disposed within an opening 7 in hub 5, the overall width of the combination of main portions 22 and 42 preferably is smaller than the diameter of opening 7 (as indicated by opening 7's sidewall limits 8, shown in FIG. 9).

Figure 10:
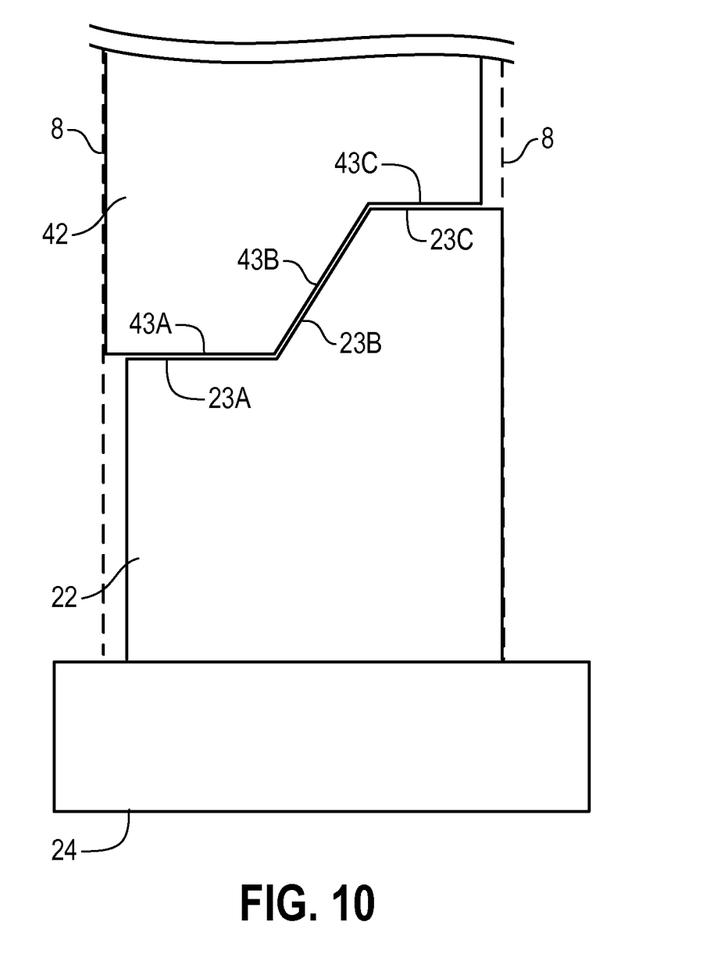
FIG. 10 is a conceptual sectional view showing the first pin component engaging with the second pin component after the two components have been fully drawn together.

Then, as pin components 20 and 40 are drawn closer together, they slide, both vertically and laterally, along their angled surfaces 23B and 43B, both shortening the overall length and increasing the overall width (at least in that one dimension) of the combination of pin components 20 and 40. This expansion of width causes the side surfaces of main portions 22 and 42 to press against sidewall 8 (as shown in FIG. 10), thereby tightly securing the entire drive pin assembly to hub 5.

It should be noted that the precise surface configurations of engagement ends 23 and 43 are not critical. Preferably, however, when the two components are drawn together such surfaces (or at least portions of them) are able to slide against each other in such a way that the overall width of the combination increases. Thus, for example, angled portions 23B and 43B could be curved instead of straight, and/or such angled portions 23B and 43B could occupy a greater or lesser proportion of the width of the main portions 22 and 42, respectively, potentially even occupying the entire width.

Any of a variety of different tightening mechanisms can be used to draw pin components 20 and 40 together. In one representative embodiment, illustrated in FIG. 11, pin component 20 has internal threads and pin component 40 has an interior space 45 that is configured as a cylindrical passageway extending all the way through it from its outer end 44 to its engagement end 43. In order to assemble and attach the pin assembly in this embodiment, the distal (threaded) end of a bolt 60 is inserted through a washer 61 and into the outer end 44 of component 40, exits the engagement end 43 of component 40, enters the engagement end 23 of component 20, and then is rotated relative to component 20 so that its threads mate with the internal threads of component 20. As the threads further engage, components 20 and 40 are drawn closer together, with the enlarged outer end 24 of component 20 pressing against the surface surrounding opening 7 in hub 5 and with the proximal end (enlarged head) 62 of bolt 60 eventually coming into contact with the outer end 44 of component 40. Preferably, outer end 44 of component 40 is beveled, as shown in the drawings, and a bevel washer is placed between bolt head 62 and outer end 44.

Figure 11:
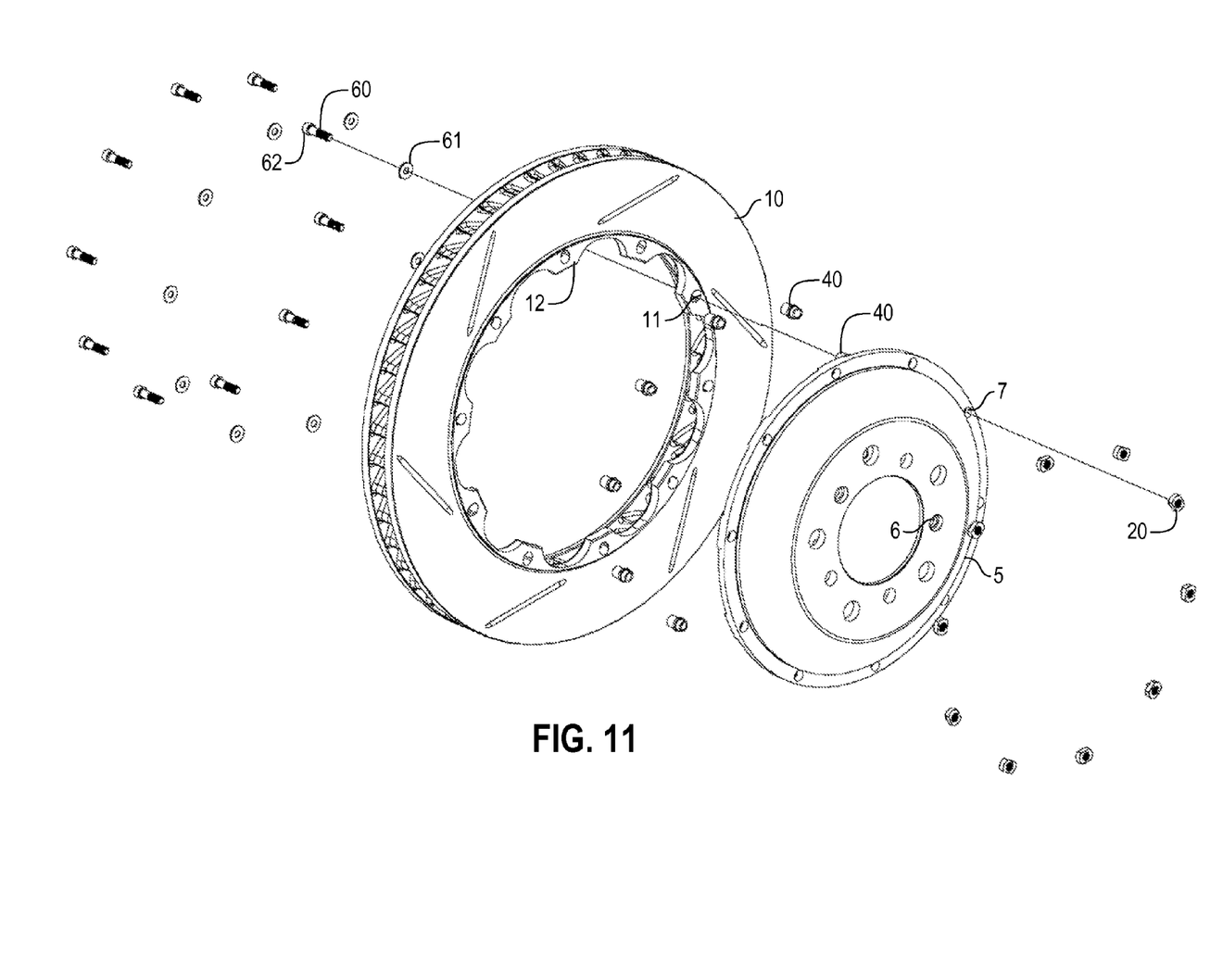
FIG. 11 is an exploded perspective view showing the attachment of a disc brake rotor to a hub according to a representative embodiment of the present invention.

When all of the pin assemblies have been installed in this manner, rotor 10 is locked into rotational alignment with hub 5. At the same time, the space between collar 46 and bolt head 62 is sufficiently larger than the thickness of rotor mounting ring 12 that main portion 42 of component 40 is able to freely slide within its corresponding slot 11, thereby enabling rotor 10 to expand and contract radially.

Variations on the foregoing embodiment are possible. For instance, in the preceding embodiment, component 20 has internal threads. In alternate embodiments, component 20 is provided with a smooth internal surface, and a separate nut is used to engage with the distal (threaded) end of bolt 60, such that bolt 60 and the referenced nut constitute the tightening mechanism. However, in these alternate embodiments, the overall length of the drive pin assembly often will be increased, as compared with just using an internally threaded component 20.

According to another alternate embodiment, the pin component 40 is internally threaded and has an enlarged head at its outer end 44, and pin component 20 is open at both ends and has a smooth internal passageway throughout its length, including an opening at its outer end 24 for accepting a bolt. In other words, in this alternate embodiment the tightening mechanism essentially works in the opposite direction as compared to the embodiment discussed above.

Additional Considerations.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A drive pin assembly, comprising:
   a first pin component having a width, a length, an outer end and an engagement end, the engagement end of the first pin component opening to an interior space and having an angled surface that extends for at least a portion of the width and a portion of the length of said first pin component; and
   a second pin component having a width, a length, an outer end and an engagement end, the engagement end of the second pin component opening to an interior space and having an angled surface that extends for at least a portion of the width and a portion of the length of said second pin component;
   a mounting component that includes an opening defined by a sidewall; and
   a tightening mechanism at least partially disposed within the interior space of the first pin component and the interior space of the second pin component, for drawing the first pin component and the second pin component closer together,
   wherein the engagement end of the first pin component contacts the engagement end of the second pin component within said opening in the mounting component,
   wherein the angled surface of the first pin component matches the angled surface of the second pin component such that when the first pin component and the second pin component are drawn together, the first pin component and the second pin component slide both vertically and laterally along each other and outer side surfaces of the first pin component and the second pin component are pressed against the sidewall of the opening in the mounting component, and
   wherein said mounting component is attached to at least one of a drive assembly and an axle assembly for a motorized vehicle.

2. A drive pin assembly according to claim 1, further comprising a disc brake rotor having a mounting section that includes an opening, and wherein the outer end of the second pin component extends through the opening in the mounting section of the disc brake rotor.

3. A drive pin assembly according to claim 2, wherein the second pin component includes a collar disposed on its outer surface at a distance from its outer end that is slightly greater than a thickness of the mounting section of the rotor in a vicinity of the opening in the mounting section.

4. A drive pin assembly according to claim 2, wherein the outer end of the second pin component also includes an opening.

5. A drive pin assembly according to claim 4, wherein the tightening mechanism comprises a bolt that extends into the opening in the outer end of the second pin component.

6. A drive pin assembly according to claim 5, wherein the mounting section of the rotor is disposed between an enlarged head of the bolt and the collar.

7. A drive pin assembly according to claim 6, wherein the opening in the disc brake rotor is just wide enough to accommodate the outer end of the second pin component in the circumferential dimension and is elongated in the radial direction, thereby accommodating radial expansion and contraction of the disc brake rotor when the outer end of the second pin component extends through the opening in the disc brake rotor and when the bolt fully tightened.

8. A drive pin assembly according to claim 1, wherein the outer end of the second pin component also is open, and wherein an interior passageway extends from the outer end of the second pin component to the engagement end of the second pin component.

9. A drive pin assembly according to claim 8, further comprising a bolt that extends through the passageway of the second pin component and into the opening in the engagement end of the first pin component.

10. A drive pin assembly according to claim 9, wherein the bolt has an enlarged head at its proximal end, adjacent to the outer end of the second pin component, and has threads at its distal end, and wherein the interior space of the first pin component has internal threads that mate with the threads at the distal end of the bolt.

11. A drive pin assembly according to claim 1, wherein the angled surfaces of the first pin component and the second pin component are substantially straight.

12. A drive pin assembly according to claim 11, wherein the angled surface of the engagement end of the first pin component is disposed within a middle portion of the engagement end of the first pin component and outer portions of the engagement end of the first pin component are substantially flat and horizontal, and wherein the angled surface of the engagement end of the second pin component is disposed within a middle portion of the engagement end of the second pin component and outer portions of the engagement end of the second pin component are substantially flat and horizontal.

13. A drive pin assembly according to claim 1, wherein the angled surfaces of the first pin component and the second pin component are laterally offset from each other.

14. A drive pin assembly according to claim 1, wherein a combined assembly of the first pin component and the second pin component increases in width when the first pin component and the second pin component are drawn together.

\* \* \* \* \*